(12) United States Patent
Helfer

(10) Patent No.: US 8,727,310 B2
(45) Date of Patent: May 20, 2014

(54) PACKING FOLLOWERS FOR USE WITH VALVES

(75) Inventor: Wade J. Helfer, Ames, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 1171 days.

(21) Appl. No.: 12/258,017

(22) Filed: Oct. 24, 2008

(65) Prior Publication Data

US 2010/0102262 A1   Apr. 29, 2010

(51) Int. Cl.
*F16K 41/00* (2006.01)

(52) U.S. Cl.
USPC .......................................... 251/214; 251/305

(58) Field of Classification Search
USPC .......................................... 251/214, 305–308
See application file for complete search history.

(56) References Cited

U.S. PATENT DOCUMENTS

| | | | | |
|---|---|---|---|---|
| 3,148,901 | A | * | 9/1964 | Campbell ...................... 285/212 |
| 3,677,514 | A | * | 7/1972 | Mencarelli ..................... 251/214 |
| 3,746,301 | A | * | 7/1973 | Budzich et al. ................. 251/64 |
| 3,982,729 | A | * | 9/1976 | Tricini ........................... 251/214 |
| 4,270,559 | A | * | 6/1981 | Wallberg ........................ 251/305 |
| 4,270,730 | A | * | 6/1981 | Hinrichs ........................ 251/214 |
| 4,489,916 | A | * | 12/1984 | Stevens ......................... 251/214 |
| 4,492,362 | A | * | 1/1985 | Garcia et al. ................... 251/363 |
| 4,541,612 | A | * | 9/1985 | Yohner .......................... 251/308 |
| 4,659,064 | A | * | 4/1987 | Scobie et al. .................. 251/214 |
| 4,830,043 | A | | 5/1989 | Heyl |
| 4,892,320 | A | * | 1/1990 | Tuckmantel ................... 277/535 |
| 4,893,781 | A | | 1/1990 | Kalain et al. |
| 4,958,802 | A | * | 9/1990 | Underwood ................... 251/214 |
| 5,234,194 | A | * | 8/1993 | Smith ............................ 251/214 |
| 5,634,486 | A | * | 6/1997 | Hatting et al. ................. 251/214 |
| 6,095,493 | A | * | 8/2000 | Velan ............................. 251/214 |
| 6,202,668 | B1 | * | 3/2001 | Maki .............................. 137/72 |
| 7,249,751 | B2 | * | 7/2007 | Hall et al. ...................... 251/214 |

FOREIGN PATENT DOCUMENTS

| | | |
|---|---|---|
| DE | 4430181 | 2/1996 |
| GB | 1354260 | 6/1974 |
| JP | 5329818 | 8/1951 |
| JP | 6273176 | 5/1987 |
| JP | 360673 | 6/1991 |

OTHER PUBLICATIONS

Patent Cooperation Treaty, "International Preliminary Report on Patentability," issued by the International Searching Authority in connection with related PCT application No. PCT/US2009/057865, mailed Apr. 26, 2011 (6 pages).

(Continued)

*Primary Examiner* — John Bastianelli

(74) *Attorney, Agent, or Firm* — Hanley, Flight and Zimmerman, LLC

(57) ABSTRACT

Packing followers for use with valves are described. An example packing follower for use with a valve includes a body having an elongated portion and a bore therethrough to receive a shaft. A portion of the bore is tapered to exert a force on a retainer that at least partially surrounds and is positioned within a groove of the shaft when the shaft moves toward an opening defined by the body. Additionally, the force has a first component in a direction perpendicular to a longitudinal axis of the bore and a second component smaller than the first component in a direction parallel to the longitudinal axis of the bore.

11 Claims, 8 Drawing Sheets

(56) References Cited

OTHER PUBLICATIONS

Patent Cooperation Treaty, "Written Opinion of the International Searching Authority," issued by the International Searching Authority in connection with related PCT application No. PCT/US2009/057865, mailed Jan. 7, 2010 (5 pages).

Patent Cooperation Treaty, "International Search Report," issued by the International Searching Authority in connection with related PCT application No. PCT/US2009/057865, mailed Jan. 7, 2010 (4 pages).

Chinese State Intellectual Property Office, "First Office Action," issued in connection with Chinese Patent Application No. 200980142543.4, mailed on Sep. 5, 2012, 11 pages.

Japanese Patent Office, "Notice of Reasons of Rejection," issued in connection with Japanese Patent Application No. 2011-533209 on Dec. 3, 2013, 11 pages.

Japan Standards Association, "C-Shaped Stop Rings," JIS Handbook Machine Elements, 1st Edition. 1st Printing, pp. 832-834, Apr. 2, 1995.

* cited by examiner

PACKING FOLLOWERS FOR USE WITH VALVES

FIELD OF THE DISCLOSURE

This patent relates generally to packing followers and, more specifically, to packing followers for use with valves.

BACKGROUND

Process control plants or systems often employ rotary valves, such as ball valves, butterfly valves, eccentric-disk valves, eccentric-plug valves, etc., to control the flow of process fluids. In general, rotary valves typically include a fluid flow control member disposed in the fluid path and rotatably coupled to the body of the rotary valve via a shaft. Typically, a portion of the shaft extending from the rotary valve is operatively coupled to a stem of an actuator (e.g., a pneumatic actuator, an electric actuator, a hydraulic actuator, etc.) of the rotary control valve.

In some instances, to be in compliance with standards created by regulatory bodies, such as the American Society of Mechanical Engineers, redundant blowout protection is added to valves to ensure that the shaft is retained within the valve body if a primary connection between the shaft and the fluid flow control member fails.

In some known examples, the redundant blowout protection includes a shaft having a step that engages a portion of a packing follower. However, removing material from the shaft to form the step decreases the structural integrity of the shaft. As a result, a fluid force against the fluid flow control member may twist and/or turn the shaft while an end of the shaft is held stationary, which enables fluid to flow through the valve even if the fluid flow control member is actuated to the closed position.

In other known examples, the redundant blowout protection includes a shaft having a groove that receives a snap-ring that engages a portion of a packing follower. However, depending upon the pressure requirements of the system, the interaction between the snap-ring and the portion of the packing follower may not retain the snap-ring within the groove if the primary connection between the flow control member and the shaft fails and, thus, this configuration is limited to relatively low pressure applications.

SUMMARY

An example packing follower for use with a valve includes a body having an elongated portion and a bore therethrough to receive a shaft. A portion of the bore is tapered to exert a force on a retainer that at least partially surrounds and is positioned within a groove of the shaft when the shaft moves toward an opening defined by the body. Additionally, the force has a first component in a direction perpendicular to a longitudinal axis of the bore and a second component smaller than the first component in a direction parallel to the longitudinal axis of the bore.

An example valve includes a body that defines an aperture and a first bore. Additionally, the valve includes a shaft that is at least partially positioned within the first bore. The shaft has a groove to receive a retainer that at least partially surrounds and which is positioned within the groove. Further, the valve includes a fluid flow control member positioned within the aperture and operatively coupled to the shaft to control a flow of fluid through the valve. Further yet, the valve includes a packing follower that is coupled to the valve and at least partially positioned within the first bore. The packing follower includes an elongated portion and a second bore therethrough to receive the shaft. The second bore has a tapered portion configured to exert a force on the retainer when the shaft moves toward an opening of the packing follower. Additionally, the force has a first component in a direction perpendicular to a longitudinal axis of the bore and a second component smaller than the first component in a direction parallel to the longitudinal axis of the bore.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The example packing followers described herein advantageously enable redundant blowout protection configurations to be implemented in valves having relatively high pressure ratings, which eliminates the limitations encountered with known packing followers. In particular, the example packing followers described herein are provided with a bore having a tapered inner surface that is configured to exert a force having a first component and a second component on a retainer (e.g., a retaining anti-blowout ring, a snap-ring) positioned within a grove of a shaft extending through the bore. Specifically, the first component of the force is approximately perpendicular to a longitudinal axis of the bore and the second component of the force is approximately parallel to the longitudinal axis of the bore. In contrast to known packing followers, the example packing followers described herein recognize and exploit the manner in which the relationship between the shaft and the angle of the tapered surface relative to the bore impacts the magnitude of both the first component of the force and the second component of the force. In particular, the tapered surface of the example packing followers described herein is configured so that the first component of the force is larger than the second component of the force to ensure that a majority of the force exerted on the retainer due to the tapered surface is utilized to retain the retainer within a groove of the shaft, thereby, enabling the example packing followers described herein to be implemented in valves having relatively larger pressure ratings, which typically involves larger forces that urge the shaft to exit the valve if the primary connection between the shaft and the fluid flow control member fails.

Figure 1A:
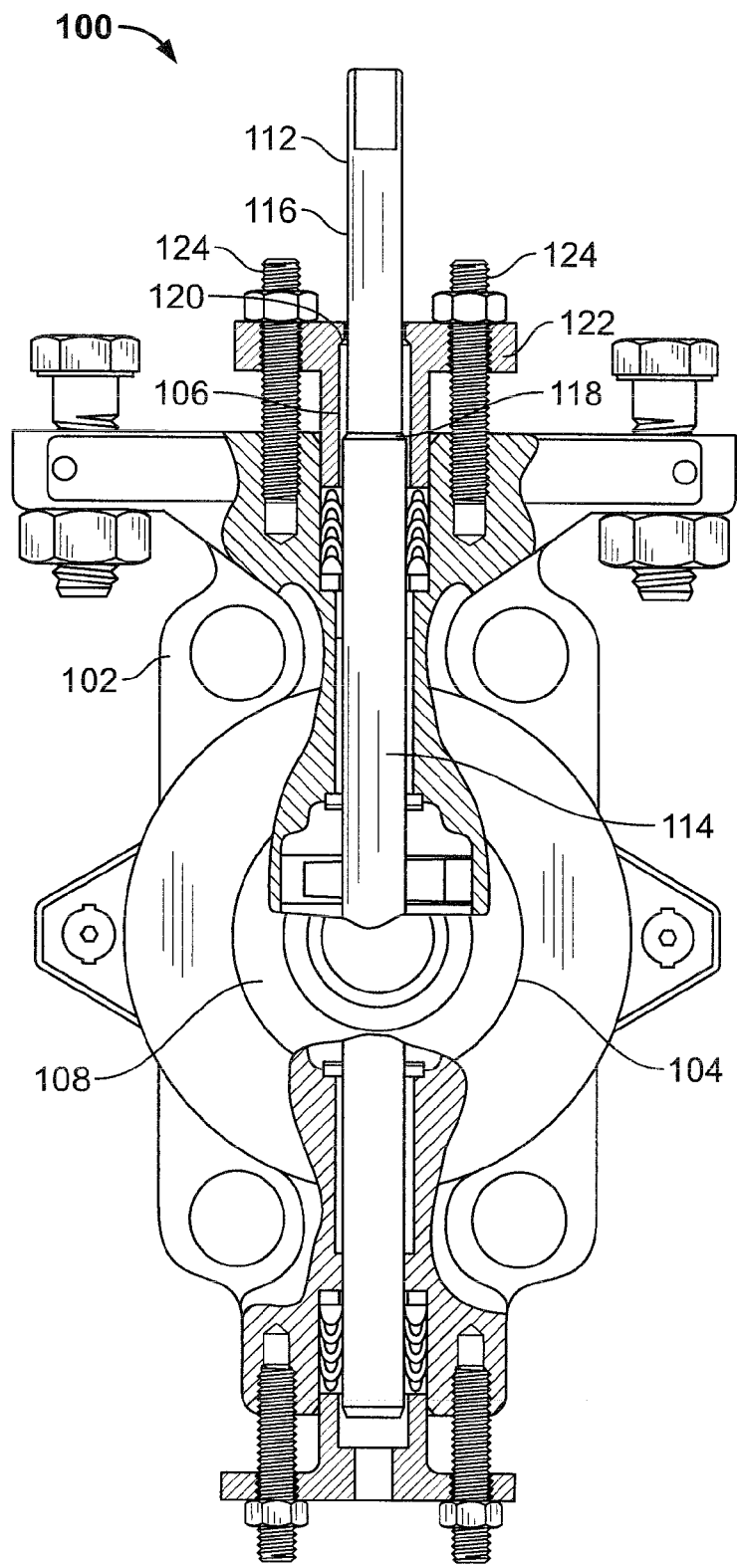
FIG. 1A depicts a partial cross-sectional view of a known butterfly valve.
Figure 1B:
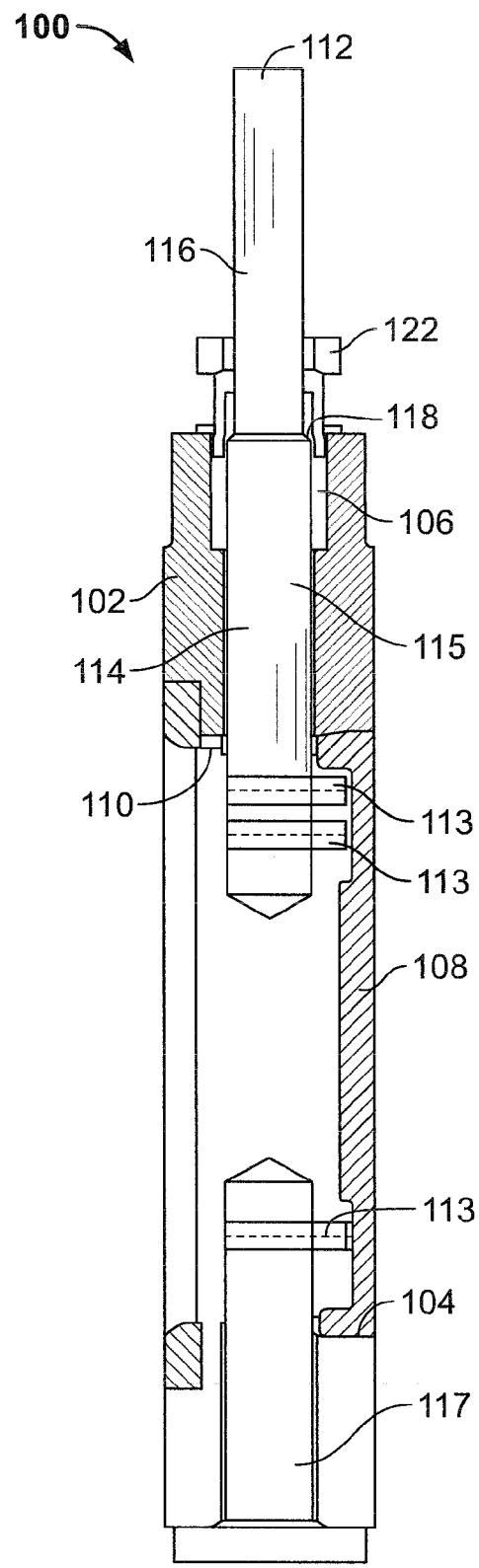
FIG. 1B depicts another partial cross-sectional view of the known butterfly valve of FIG. 1A.

FIG. 1A depicts a known butterfly valve 100 that includes a body 102 that defines an aperture 104 and a bore 106. A fluid flow control member 108 is at least partially positioned within the aperture 104 to engage a seal assembly 110 (e.g., a seal ring, etc.). Additionally, as shown in FIG. 1B, the fluid flow control member 108 is coupled to a shaft 112 via a plurality of pins 113 (e.g., the primary connection). The shaft 112 includes a first shaft portion 115 and a second shaft portion 117 and is partially positioned within the bore 106. The coupling between the shaft 112 and the fluid flow control member 108 may be considered a primary connection. In practice, the fluid flow control member 108 engages the seal assembly 110 to control the flow of the fluid through the aperture 104 and, thus, the rate of fluid flow through the valve 100 is controlled by the position of the fluid flow control member 108 relative to the seal assembly 110. The position of the fluid flow control member 108 may be varied from a closed position at which the fluid flow control member 108 is in sealing engagement with the seal assembly 110 to a fully open or maximum flow rate position at which the fluid flow control member 108 is spaced away from the seal assembly 110 and/or substantially parallel to the flow of fluid through the aperture 104.

The first shaft portion 115 includes a first portion 114 having a first diameter and a second portion 116 having a second diameter that is less than the first diameter. A step 118 provided between the first portion 114 and the second portion 116 engages a lip 120 of a packing follower 122 to retain the shaft 112 at least partially within the valve 100 (e.g., redundant blowout protection) if the primary connection between the shaft 112 and the fluid flow control member 108 fails. The packing follower 122 is removably coupled to the body 102 via a plurality of fasteners 124. As discussed above, forming the step 118 between the first portion 114 and the second portion 116 decreases the structural integrity of the shaft 112 and, thus, in practice, the flow of fluid may exert a force on the fluid flow control member 108 in, for example, the closed position, that twists the shaft 112 and compromises a substantially bubble tight seal between the fluid flow control member 108 and the seal assembly 110.

Figure 2A:
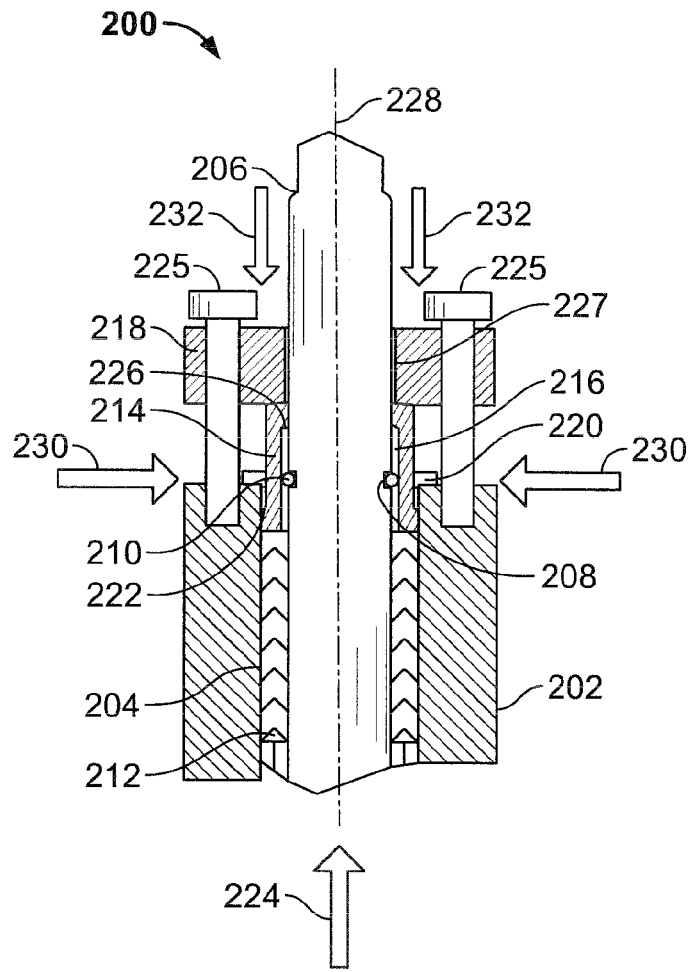
FIG. 2A depicts a portion of a known valve having redundant blowout protection.

FIG. 2A depicts a portion of a known valve 200 that functions similarly to the valve 100 described above in connection with FIG. 1A. The valve 200 includes a body 202 that defines a first bore 204 and a shaft 206 having a groove 208 that receives a retainer 210 (e.g., a retaining anti-blowout ring, a snap-ring). Additionally, the valve 200 includes a valve packing 212, a packing follower 214 that defines a second bore 216, a packing flange 218 and an anti-blowout flange 220 that may be engaged by an exterior lip 222 of the packing follower 214 to further retain the packing follower 214 within the first bore 204 if the primary connection between the shaft 206 and a fluid flow control member (e.g., the fluid flow control member 108 of FIG. 1A) fails.

The shaft 206 is partially positioned within the first bore 204 defined by the body 202 along with a portion of the packing follower 214 that urges the valve packing 212 against the shaft 206 to substantially prevent fluid from exiting the valve 200 between the shaft 206 and the valve packing 212.

As shown, the packing flange 218 is coupled to the body 202 via a plurality of fasteners 225 and the packing follower 214 is positioned between the packing flange 218 and the valve packing 212. Additionally, the shaft 206 is partially positioned within the second bore 216 of the packing follower 214 and through an aperture 227 defined by the packing flange 218.

As discussed above, if the primary connection between the shaft 206 and a fluid flow control member fails, the pressure within the valve 200 exerts a force in a direction represented by arrow 224, which urges the shaft 206 out of the valve 200. To prevent the shaft 206 from exiting the valve 200, the packing follower 214 is provided with an interior shoulder or lip 226 that is engaged by the retainer 210 positioned within the groove 208 if the primary connection fails. The force exerted between the retainer 210 and the interior lip 226 is represented by Equation 1 below, where F represents the force applied between the retainer 210 and the interior lip 226, P represents the corresponding pressure rating for the particular valve and $D_s$ represents the outside diameter of the shaft 206.

$$F = P * (\Pi * D_s^2/4) \qquad \text{Equation 1}$$

The force applied between the retainer 210 and the interior lip 226 may have a first component that is approximately perpendicular to a longitudinal axis 228 of the second bore 216 as generally represented by arrows 230. Further, the force applied between the retainer 210 and the interior lip 226 has a second component that is approximately parallel to the longitudinal axis 228 of the second bore 216 as generally represented by arrows 232.

The first component of the force is represented by Equation 2 below, where $F_{first\ component}$ represents the first component of the force that is approximately perpendicular to the longitudinal axis 228, F represents the force applied between the retainer 210 and the interior lip 226 and θ represents the angle of the interior lip 226 relative to the longitudinal axis 228.

$$F_{first\ component} = F * \cos(\theta) \qquad \text{Equation 2}$$

The second component of the force is represented by Equation 3 below, where $F_{second\ component}$ represents the second component of the force that is approximately parallel to the longitudinal axis 228, F represents the force applied between the retainer 210 and the interior lip 226 and θ represents the angle of the interior lip 226 relative to the longitudinal axis 228.

$$F_{second\ component} = F * \sin(\theta) \qquad \text{Equation 3}$$

Figure 4:
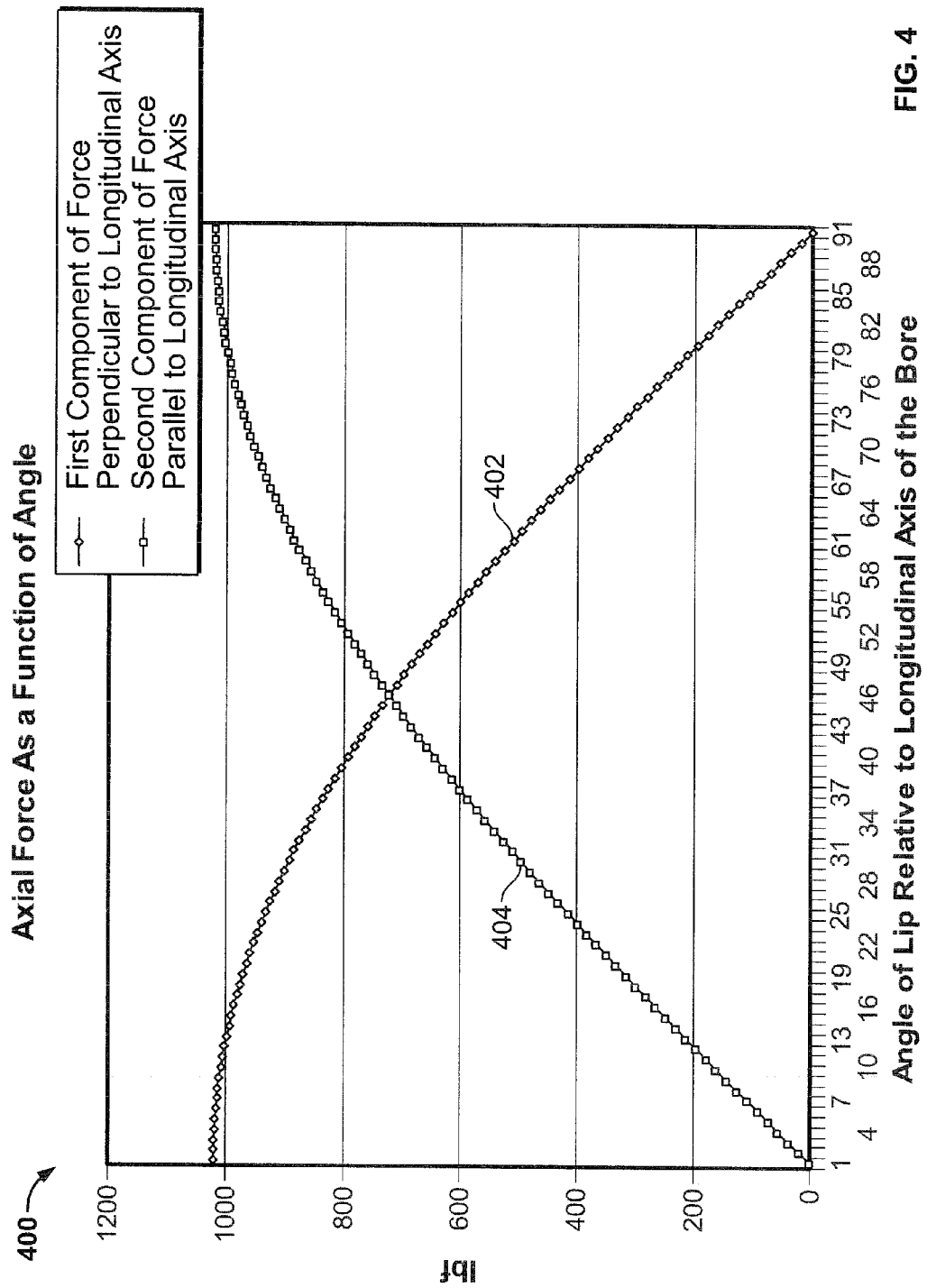
FIG. 4 depicts a graph representing the relationship between a first component of a force perpendicular to a longitudinal axis and a second component of the force parallel to the longitudinal axis as a function of an angle of a lip of a packing follower relative to the longitudinal axis.

FIG. 4 depicts a graph 400 that represents the relationship between the first component of the force and the second component of the force as a function of the angle of the interior lip 226 relative to the longitudinal axis 228. Specifically, the first component of the force is represented by a first curve 402 and the second component of the force is represented by a second curve 404. In this example, the force (i.e., F) is approximately 1021.017 pound-force (lbf), which corresponds to a valve having a pressure rating of approximately 1300 PSI.

As represented by the graph 400, as the angle of the interior lip 226 increases relative to the longitudinal axis 228, the first component of the force decreases and the second component of the force increases. In contrast, as the angle of the interior lip 226 decreases relative to the longitudinal axis 228, the first component of the force increases and the second component of the force decreases.

Figure 2B:
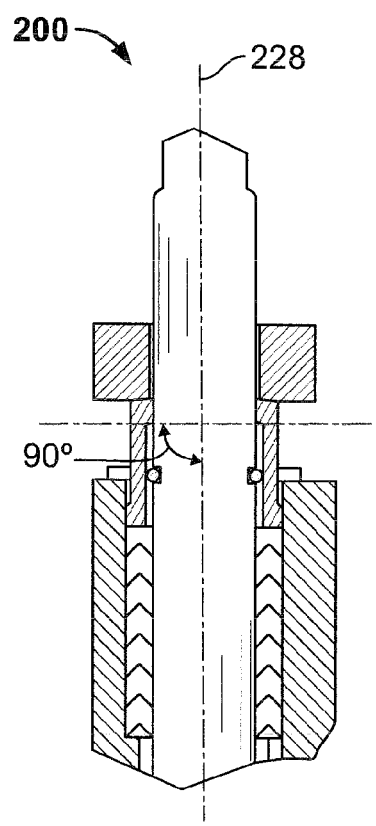
FIG. 2B depicts an angle of a lip of the packing follower of FIG. 2A relative to a longitudinal axis of a shaft of the valve.

As shown in FIG. 2B, the angle of the interior lip 226 is approximately 90 degrees relative to the longitudinal axis 228 and, thus, the first component of the force is approximately zero and the second component of the force is approximately 1021.01675 lbf. (i.e., substantially the entire force F). As a result, if the primary connection fails, the shaft 206 travels unimpeded toward an exterior of the valve 200 until the retainer 210 impacts the interior lip 226, which abruptly stops the shaft 206. If the packing follower 214 is implemented in a valve having a relatively high pressure rating, the force (F) created by the pressure (P) may be relatively large and, thus, the retainer 210 may impact the lip 226 to abruptly stop the shaft 206. Such an impact may unseat the retainer 210 from within the groove 208 and the shaft 206 may be pushed out of the valve. More specifically, if the packing follower 214 is implemented in a valve having a relatively high pressure rating and the primary connection fails, the second component of the force may be large enough to unseat the retainer 210 from within the groove 208. Therefore, the configuration depicted in FIG. 2A is typically limited to use with valves having relatively low pressure ratings.

Figure 3A:
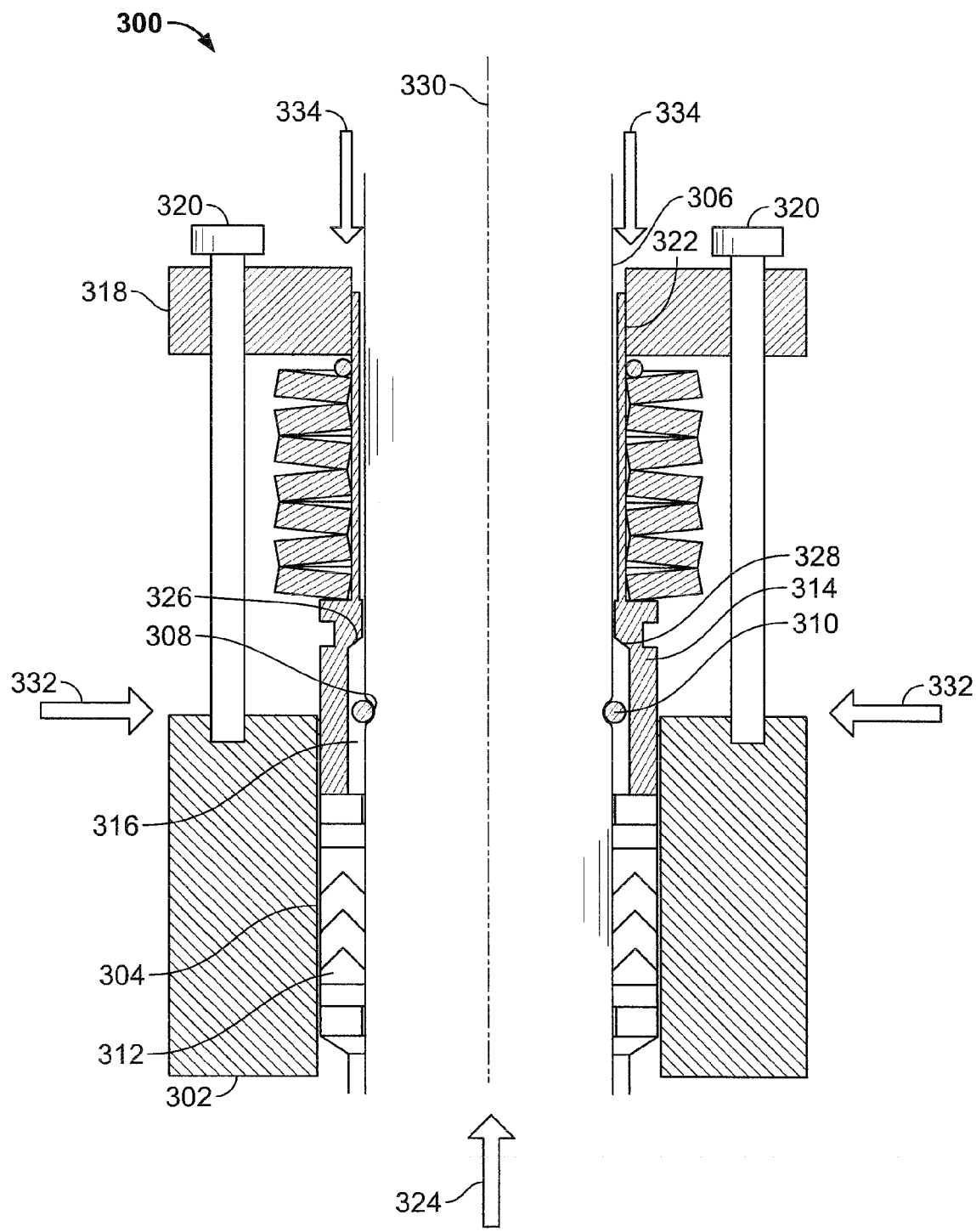
FIG. 3A depicts a portion of another known valve having redundant blowout protection.

FIG. 3A depicts a portion of a known valve 300 that functions similarly to the valve 100 described above in connection with FIG. 1A. The valve 300 includes a body 302 that defines a first bore 304 and a shaft 306 having a groove 308 that receives a retainer 310. Additionally, the valve 300 includes a valve packing 312, a packing follower 314 that defines a second bore 316 and a packing flange 318.

The shaft 306 is partially positioned within the first bore 304 defined by the body 302 along with a portion of the packing follower 314 that urges the valve packing 312 against the shaft 306 to substantially prevent fluid from exiting the valve 300 between the shaft 306 and the valve packing 312. As shown, the packing flange 318 is coupled to the body 302 via a plurality of fasteners 320 and the packing follower 314 is positioned between the packing flange 318 and the valve packing 312. Additionally, the shaft 306 is partially positioned within the second bore 316 of the packing follower 314 and through an aperture 322 defined by the packing flange 318.

As discussed above, if the primary connection between the shaft 306 and a fluid flow control member (e.g., the fluid control member 108 of FIG. 1A) fails, the pressure within the valve 300 exerts a force in a direction represented by arrow 324, which urges the shaft 306 out of the valve 300. To prevent the shaft 306 from exiting the valve 300, the packing follower 314 is provided with a shoulder or lip 326 that is engaged by the retainer 310 if the primary connection fails.

Figure 3B:
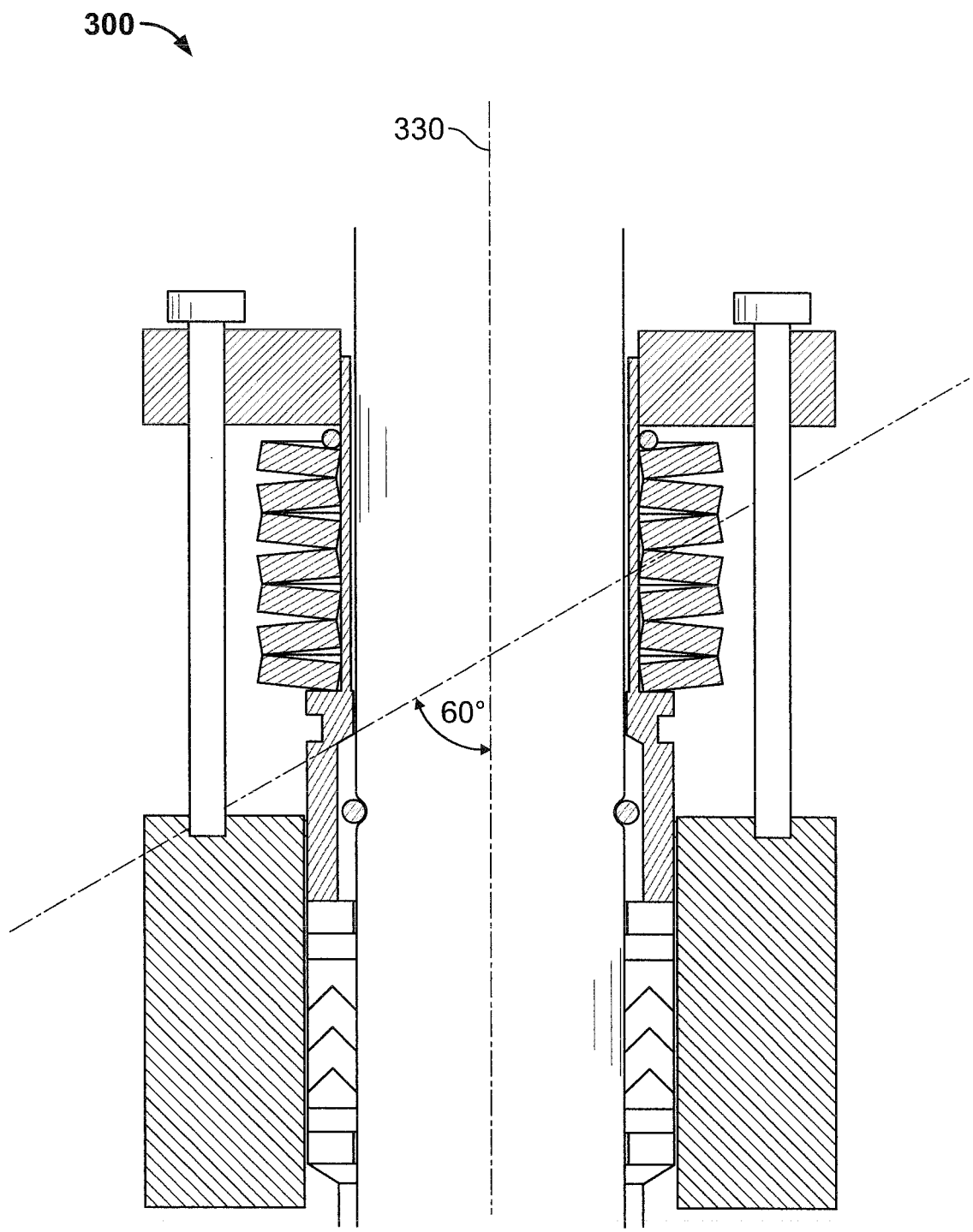
FIG. 3B depicts an angle of a lip of the packing follower of FIG. 3A relative to a longitudinal axis of a shaft of the valve.

To fabricate and/or machine the second bore 316 and the lip 326 of the packing follower 314, initially a piece of stock material (e.g., stock metal) (not shown) is obtained. The stock material is then secured in, for example, a vice of a drill press or mill and a drill bit is moved to engage the stock material to create the second bore 316 as well as the lip 326. As with other common machining tools, the drill bit used to fabricate and/or machine the packing follower 314 has a standard taper (not shown) of approximately 60 degrees and, thus, as shown in FIG. 3B, the lip has a tapered surface 328 of approximately 60 degrees relative to a longitudinal axis 330.

Turning again to FIG. 4, the graph 400 depicts that an angle of approximately 60 degrees may have a first component of the force represented by the first curve 402 of approximately 510.5 lbf. and as generally represented by arrows 332 and a second component of the force by the second curve 404 of approximately 884.23 lbf and as generally represented by arrows 334. As a result, if the primary connection fails, the shaft 306 travels unimpeded toward an exterior of the valve 300 until the retainer 310 impacts the tapered surface 328 of the lip 326, which abruptly stops the shaft 306. If the packing follower 314 is implemented in a valve having a relatively high pressure rating, the force (F) created by the pressure (P) may be relatively large and, thus, the retainer 310 may impact the lip 326 to abruptly stop the shaft 306. Such an impact may unseat the retainer 310 from within the groove 308 and the shaft 206 may be pushed out of the valve. More specifically, because the first component of the force is significantly less than the second component of the force, the first component of the force may be too small to ensure that the retainer 310 remains within the groove 308 and, as a result, the configuration depicted in FIG. 3A is typically limited to use with valves having relatively low pressure ratings.

Thus, the above-described known packing follower configurations have failed to recognize the relationship between the angle of lip 226 or 326 relative to the longitudinal axis 228 and 330 and the manner in which this angle impacts the ability to implement similar redundant blowout protection mechanisms in valves having relatively high pressure ratings.

Figure 5A:
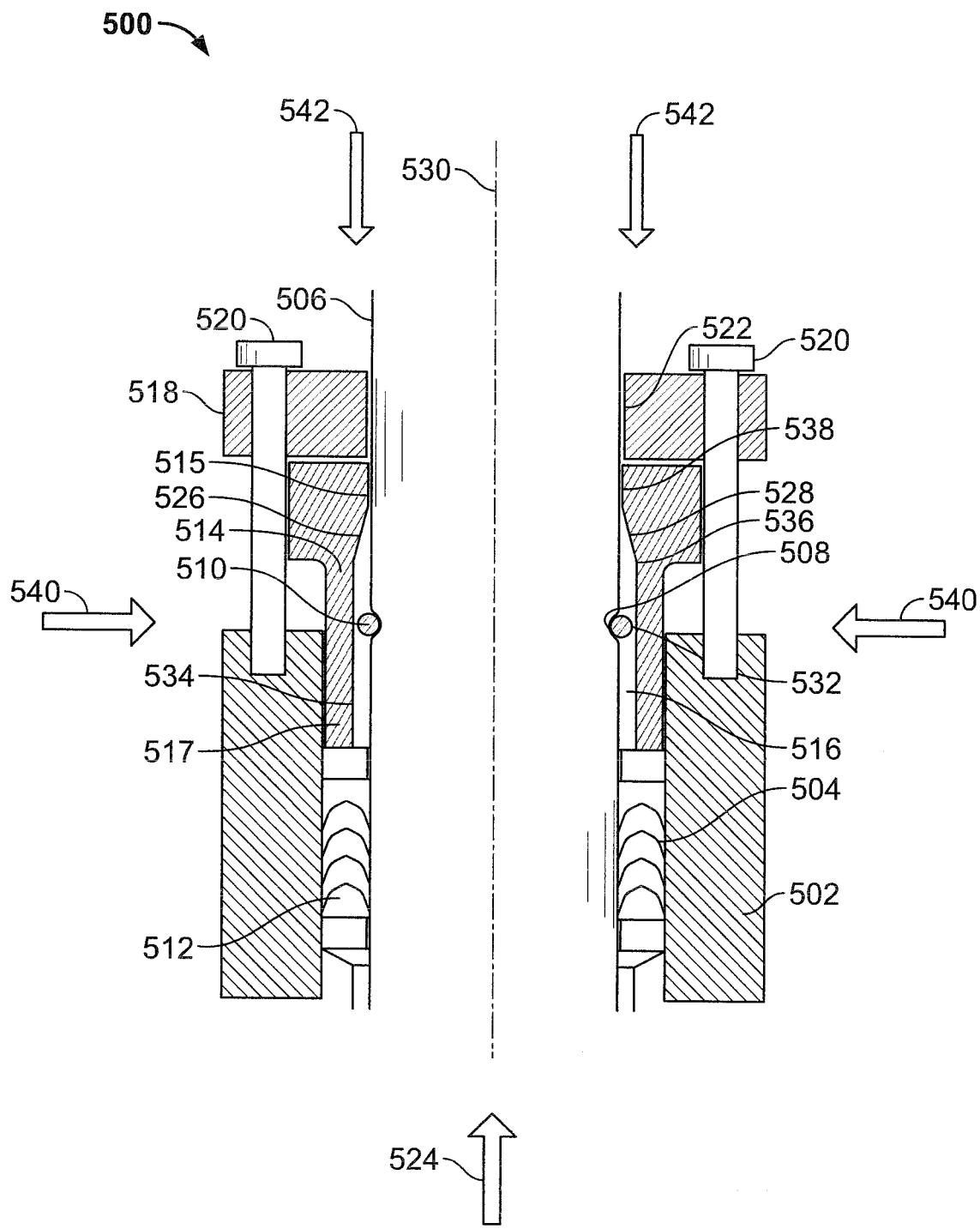
FIG. 5A depicts a portion of an example valve having an example packing follower.

FIG. 5A depicts a portion of an example valve 500 that may function similarly to the valve 100 as described above in FIG. 1A and, which may be, for example, a portion of a butterfly valve, a sliding stem valve or any other suitable valve. The valve 500 includes a body 502 that defines a first bore 504 and a shaft 506 having a groove 508 that receives a retainer 510 such as a snap-ring or anti-blowout ring that at least partially surrounds the groove 508. In some examples, the groove 508 has a diameter that is sized to partially deform the retainer 510 to further ensure that the retainer 510 maintains its position within the groove 508. Additionally, the valve 500 includes a valve packing 512, an example packing follower 514 having an opening 515 and an elongated portion 517 that defines a second bore 516, and a packing flange 518.

The shaft 506 is partially positioned within the first bore 504 defined by the body 502 along with a portion of the packing follower 514 that urges the valve packing 512 against the shaft 506 to substantially prevent fluid from exiting the valve 500 between the shaft 506 and the valve packing 512. The packing flange 518 is coupled to the body 502 via a plurality of fasteners 520 and the packing follower 514 is positioned between the packing flange 518 and the valve packing 512. Additionally, the shaft 506 is partially positioned within the second bore 516 of the packing follower 514 and through the opening 515 and an aperture 522 defined by the packing flange 518.

Figure 5B:
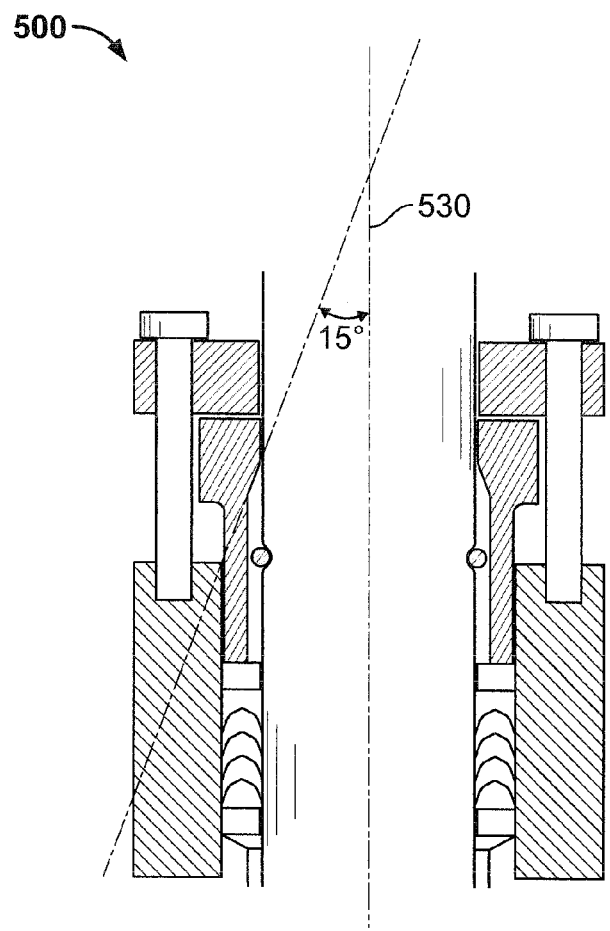
FIG. 5B depicts an angle of a lip of the example packing follower of FIG. 5A relative to a longitudinal axis of a shaft of the valve.

As discussed above, if the primary connection between the shaft 506 and the fluid flow control member (e.g., the fluid flow control member 108 of FIG. 1A) fails, the pressure within the valve 500 exerts a force in a direction represented by arrow 524, which urges the shaft 506 out of the valve 500. To prevent the shaft 506 from exiting the valve 500, the packing follower 514 is provided with a tapered surface, shoulder or lip 526 that is configured to be engaged by the retainer 510 if the primary connection fails. However, in contrast to the known examples depicted in FIGS. 2A and 3A, to fabricate and/or machine the second bore 516 and a tapered surface 528 of the lip 526, a piece of stock material is secured within a milling machine and an end mill or any other suitable tool is selected to remove material from the stock material to form the second bore 516 and/or to remove material to form the tapered surface 528 to provide an angle relative to a longitudinal axis 530 of the second bore 516 of between about 15 degrees and 45 degrees. As shown in FIG. 5B, the example packing follower 412 has an angle relative to the longitudinal axis 530 of approximately 15 degrees. However, any other suitable angle may be formed instead (e.g., 20 degrees, 25 degrees, 30 degrees, etc.).

In practice, to control the fluid flow through the valve 500, a fluid flow control member (e.g., the fluid flow control member 108 of FIG. 1A) is actuated between an open position and a closed position via the shaft 506 by, for example, an actuator (not shown). To increase the useful life of the retainer 510, a space 532 is provided between a non-tapered portion 534 of the second bore 516 and the retainer 510 to prevent the retainer 510 from engaging and/or rubbing against the non-tapered portion 534 as the shaft 506 is moved to actuate the valve 500 during normal operation.

As discussed above, if the primary connection between the shaft 506 and the fluid flow control member 108 (FIG. 1A) fails, the shaft 506 moves in the direction represented by the arrow 524 and the retainer 510 engages the tapered surface 528. Unlike the abrupt impact associated with the known packing followers 214 and 314, the tapered surface 528 of the example packing follower 514 gradually restricts the movement of the shaft 506 to prevent the shaft 506 from exiting the valve 500. Initially, the retainer 510 impacts the tapered surface 528 near a first annular position 536 and then the movement of the shaft 506 decreases until the retainer 510 is positioned substantially between the first annular position 536 and a second annular position 538. Specifically, as the retainer 510 impacts the tapered surface 528 that has, in this example, approximately a 15 degree angle, a resultant force is exerted on the retainer 510 that has a first component that is approximately perpendicular to the longitudinal axis 530 of the second bore 516 as generally represented by arrows 540. Typically, the first component of the force is substantially an annular force that urges the retainer 510 to remain seated within the groove 508. Additionally, the force exerted on the retainer 510 has a second component that is approximately parallel to the longitudinal axis 530 of the second bore 516 as generally represented by arrows 542.

Turning again to FIG. 4, as depicted in the graph 400, an angle of approximately 15 degrees has a first component of the resultant force represented by the first curve 402 of approximately 986.23 lbf. and a second component of the resultant force represented by the second curve 404 of approximately 264.26 lbf. Thus, the first component of the force is significantly larger than the second component of the force and, therefore, a majority of the resultant force (F) is utilized to maintain the position of the retainer 510 within the groove 508 and to ensure that the shaft 506 is not pushed out of the valve 500. Specifically, the tapered surface 528 of the packing follower 514 ensures that the shaft 506 is not pushed out of the valve 500 even if the packing follower 514 is implemented in valves having relatively high pressure ratings. Specifically, valves in which the force exerted on the shaft 506 may be large enough to unseat the retainer 510 from the groove 508 when the angle of the tapered surface 528 is above (e.g., greater than) approximately 45 degrees relative to the longitudinal axis 530.

Figure 6:
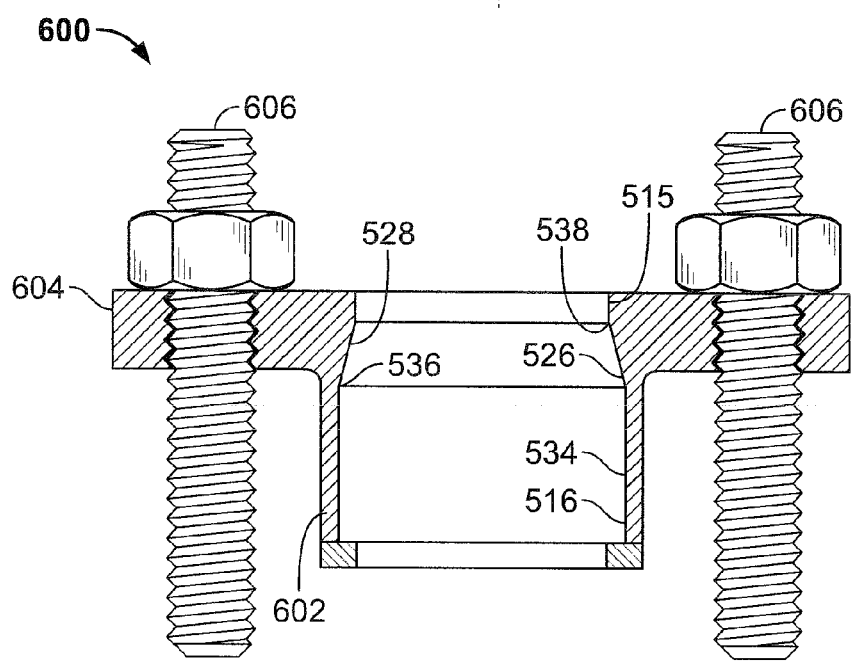
FIG. 6 depicts another example packing follower.

FIG. 6 depicts an example packing follower 600 that includes an elongated portion 602 and a flange 604. The example packing follower 600 is substantially similar to the packing follower 514 of FIG. 5A. However, the packing follower 600 has the flange 604 surrounding the opening 515 that is configured to receive a plurality of fasteners 606 to couple the packing follower 600 to, for example, the valve 500. Reference numbers in FIG. 6 that are the same as those used in FIG. 5A correspond to structures that are similar or identical to those described in connection with FIG. 5A. As such, the description relating to these structures will not be repeated here.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method of manufacturing a packing follower valve, comprising:
    providing a shaft defining a groove around which a partial ring is to be positioned, a diameter of the shaft at the groove being larger than an aperture of the partial ring to radially and outwardly deform the partial ring when the partial ring is positioned within the groove;
    providing a valve body defining a second aperture;
    positioning the shaft within the second aperture;
    providing a packing follower, the packing follower comprising an elongated portion, a flange, and a bore therethrough to receive the shaft, the flange configured to engage the valve body to limit an amount of travel of the packing follower relative to the valve body, the packing follower to urge a valve packing on the shaft; and
    milling the bore to have a tapered surface having an angle of approximately 15 degrees, the tapered surface to exert a force on the partial ring to retain the shaft within the valve when the shaft moves toward an opening defined by the packing follower, the force to have a first component in a direction perpendicular to a longitudinal axis of the bore and a second component smaller than the first component in a direction parallel to the longitudinal axis of the bore.

2. A valve, comprising:
    a valve body defining an aperture;
    a partial ring;
    a shaft at least partially positioned within the aperture, the shaft defining a groove around which the partial ring is positioned, a diameter of the shaft at the groove being larger than a second aperture of the partial ring to radially and outwardly deform the partial ring when the partial ring is positioned within the groove;
    a packing follower having an elongated portion and a bore therethrough to receive the shaft, the packing follower comprising a flange configured to engage the valve body to limit an amount of travel of the packing follower relative to the valve body, the packing follower to urge a valve packing on the shaft, the bore comprises a tapered portion having an angle of approximately 15 degrees, the tapered portion to exert a force on a retainer the partial ring to retain the shaft within the body packing follower when the shaft moves toward an opening defined by the packing follower, when the tapered portion retains the shaft within the packing follower, the partial ring is to be positioned between first and second annular positions of the tapered portion, the force has a first component in a direction perpendicular to a longitudinal axis of the bore and a second component smaller than the first component in a direction parallel to the longitudinal axis of the bore.

3. The valve as defined in claim 2, wherein the first component of the force comprises an annular force.

4. The valve as defined in claim 2, wherein a non-tapered portion of the bore is sized to provide a space between the partial ring and the non-tapered portion of the bore.

5. The valve as defined in claim 2, wherein the flange defines a step.

6. A butterfly valve, comprising:
    a body that defines an aperture and a first bore;
    a partial ring;
    a shaft that is at least partially positioned within the first bore, wherein the shaft has a groove to receive the partial ring, the partial ring partially surrounds and is positioned within the groove, a diameter of the shaft at the groove being larger than a second aperture of the partial ring to radially and outwardly deform the partial ring when the partial ring is positioned within the groove;

a fluid flow control member positioned within the aperture and operatively coupled to the shaft to control a flow of fluid through the valve;

a packing follower that is coupled to the body and at least partially positioned within the first bore, wherein the packing follower comprises:

an elongated portion, a flange integrally coupled to the elongated portion, and a second bore therethrough to receive the shaft, the body to urge a valve packing on the shaft, the flange is configured to engage the body to limit an amount of travel of the packing follower relative to the body, the second bore has a tapered portion having an angle of approximately 15 degrees, the tapered portion to exert a force on the partial ring to retain the shaft within the packing follower when the shaft moves toward an opening of the packing follower, the force has a first component in a direction perpendicular to a longitudinal axis of the second bore and a second component smaller than the first component in a direction parallel to the longitudinal axis of the second bore.

7. The butterfly valve as defined in claim 6, wherein the tapered portion includes a first annular position and a second annular position, and wherein the partial ring is positioned between the first and second annular positions when the partial ring engages the tapered portion to substantially prevent further movement of the shaft.

8. The butterfly valve as defined in claim 6, wherein the first component of the force comprises an annular force.

9. The butterfly valve as defined in claim 6, further comprising a space between the partial ring and a non-tapered surface of the second bore to substantially prevent the partial ring from engaging the non-tapered surface.

10. A butterfly valve, comprising:

a valve body;

a shaft defining a groove around which a partial ring is to be positioned, a diameter of the shaft at the groove being larger than an aperture of the partial ring to radially and outwardly deform the partial ring when the partial ring is positioned within the groove; and a packing follower to be coupled to the valve body, the packing follower having an elongated portion a flange, and a bore therethrough to receive the shaft, the flange configured to engage the valve body to limit an amount of travel of the packing follower relative to the valve body, the body to urge a valve packing on the shaft, a portion of the bore comprises an approximately fifteen degree angle to exert a force on the partial ring to retain the shaft within the packing follower when the shaft moves toward an opening of the packing follower, the force has a first component in a direction perpendicular to a longitudinal axis of the bore and a second component smaller than the first component in a direction parallel to the longitudinal axis of the bore.

11. The valve as defined in claim 2, wherein the tapered portion is produced by milling.

* * * * *

UNITED STATES PATENT AND TRADEMARK OFFICE
CERTIFICATE OF CORRECTION

PATENT NO.         : 8,727,310 B2
APPLICATION NO.    : 12/258017
DATED              : May 20, 2014
INVENTOR(S)        : Wade J. Helfer It is certified that error appears in the above-identified patent and that said Letters Patent is hereby corrected as shown below:

In the Claims:

In Column 8, line 4 (Claim 1):   Delete "packing follower" before "valve;"

In Column 8, line 44 (Claim 2):  Delete "a retainer" between "on" and "the;"

In Column 8, line 45 (Claim 2):  Delete "body" between "the" and "packing;"

Signed and Sealed this
Twelfth Day of August, 2014

Michelle K. Lee
*Deputy Director of the United States Patent and Trademark Office*